(12) United States Patent
Wookey

(10) Patent No.: US 8,904,003 B2
(45) Date of Patent: Dec. 2, 2014

(54) METHOD AND SYSTEM FOR DELEGATED JOB CONTROL ACROSS A NETWORK

(75) Inventor: Michael J. Wookey, Los Gatos, CA (US)

(73) Assignee: Oracle America, Inc., Redwood Shores, CA (US)

(*) Notice: Subject to any disclaimer, the term of this patent is extended or adjusted under 35 U.S.C. 154(b) by 1799 days.

(21) Appl. No.: 12/165,334

(22) Filed: Jun. 30, 2008

(65) Prior Publication Data

US 2009/0328065 A1  Dec. 31, 2009

(51) Int. Cl.
 *G06F 15/173* (2006.01)
 *G06F 15/16* (2006.01)
 *G06F 9/50* (2006.01)
 *H04L 12/24* (2006.01)

(52) U.S. Cl.
 CPC .......... *G06F 9/5055* (2013.01); *H04L 41/0233* (2013.01)
 USPC ........... 709/226; 709/203; 709/217; 709/223; 709/224; 709/225; 709/235

(58) Field of Classification Search
 USPC .......................... 709/203, 217, 223–226, 235
 See application file for complete search history.

(56) References Cited

U.S. PATENT DOCUMENTS

| | | | | |
|---|---|---|---|---|
| 5,410,722 | A * | 4/1995 | Cornaby | 718/102 |
| 6,202,080 | B1 * | 3/2001 | Lu et al. | 718/105 |
| 6,213,652 | B1 * | 4/2001 | Suzuki et al. | 358/1.15 |
| 6,263,358 | B1 * | 7/2001 | Lee et al. | 718/100 |
| 6,389,464 | B1 | 5/2002 | Krishnamurthy et al. | |
| 6,732,139 | B1 * | 5/2004 | Dillenberger et al. | 718/102 |
| 6,978,314 | B2 | 12/2005 | Tarr | |
| 6,988,139 | B1 * | 1/2006 | Jervis et al. | 709/226 |
| 7,148,991 | B2 * | 12/2006 | Suzuki et al. | 358/1.5 |
| 7,200,676 | B2 * | 4/2007 | Christensen et al. | 709/238 |
| 7,299,466 | B2 * | 11/2007 | Pulsipher et al. | 718/102 |
| 7,630,092 | B1 * | 12/2009 | Suzuki et al. | 358/1.14 |
| 8,185,620 | B1 * | 5/2012 | Boone et al. | 709/224 |
| 2002/0004814 | A1 * | 1/2002 | Tanaka | 709/201 |
| 2002/0004815 | A1 | 1/2002 | Muhlestein et al. | |
| 2002/0062334 | A1 * | 5/2002 | Chen et al. | 709/200 |
| 2002/0078130 | A1 * | 6/2002 | Thornton et al. | 709/201 |
| 2002/0138558 | A1 * | 9/2002 | Ferlitsch | 709/203 |
| 2003/0120710 | A1 * | 6/2003 | Pulsipher et al. | 709/106 |
| 2004/0037423 | A1 * | 2/2004 | Ghanea-Hercock | 380/270 |
| 2004/0237088 | A1 * | 11/2004 | Miki et al. | 718/102 |
| 2005/0198634 | A1 * | 9/2005 | Nielsen et al. | 718/100 |
| 2006/0017969 | A1 * | 1/2006 | Ly et al. | 358/1.15 |
| 2006/0075408 | A1 * | 4/2006 | Powers et al. | 718/100 |
| 2006/0107266 | A1 * | 5/2006 | Martin et al. | 718/100 |
| 2006/0200266 | A1 * | 9/2006 | Fotakis et al. | 700/121 |

(Continued)

*Primary Examiner* — Hieu Hoang
*Assistant Examiner* — Angela Widhalm
(74) *Attorney, Agent, or Firm* — Osha Liang LLP

(57) ABSTRACT

A method for job delegation including receiving a job from a user by a first management object, identifying a target system for the job using a data model in the first management object and a job delegation policy, where the data model comprises an object representing the target system, and determining a first nexthop for the target system, where the first nexthop is a second management object. The method also includes placing the job on a queue corresponding to the second management object, where the queue is located in the first management object, receiving the job by the second management object, locating the target system and a driver corresponding to the target system using the second management object, and executing the job using the driver corresponding to the target system.

11 Claims, 12 Drawing Sheets

(56) References Cited

U.S. PATENT DOCUMENTS

| | | |
|---|---|---|
| 2006/0268317 A1* | 11/2006 | Lofthus et al. ............... 358/1.15 |
| 2007/0088814 A1 | 4/2007 | Torii |
| 2007/0094270 A1* | 4/2007 | Gallino et al. ................. 707/10 |
| 2007/0192385 A1 | 8/2007 | Prahlad et al. |
| 2008/0049254 A1* | 2/2008 | Phan et al. ................... 358/1.16 |
| 2009/0180142 A1* | 7/2009 | Suzuki et al. ................ 358/1.15 |
| 2010/0115478 A1* | 5/2010 | Pedenon et al. ................. 716/4 |

* cited by examiner

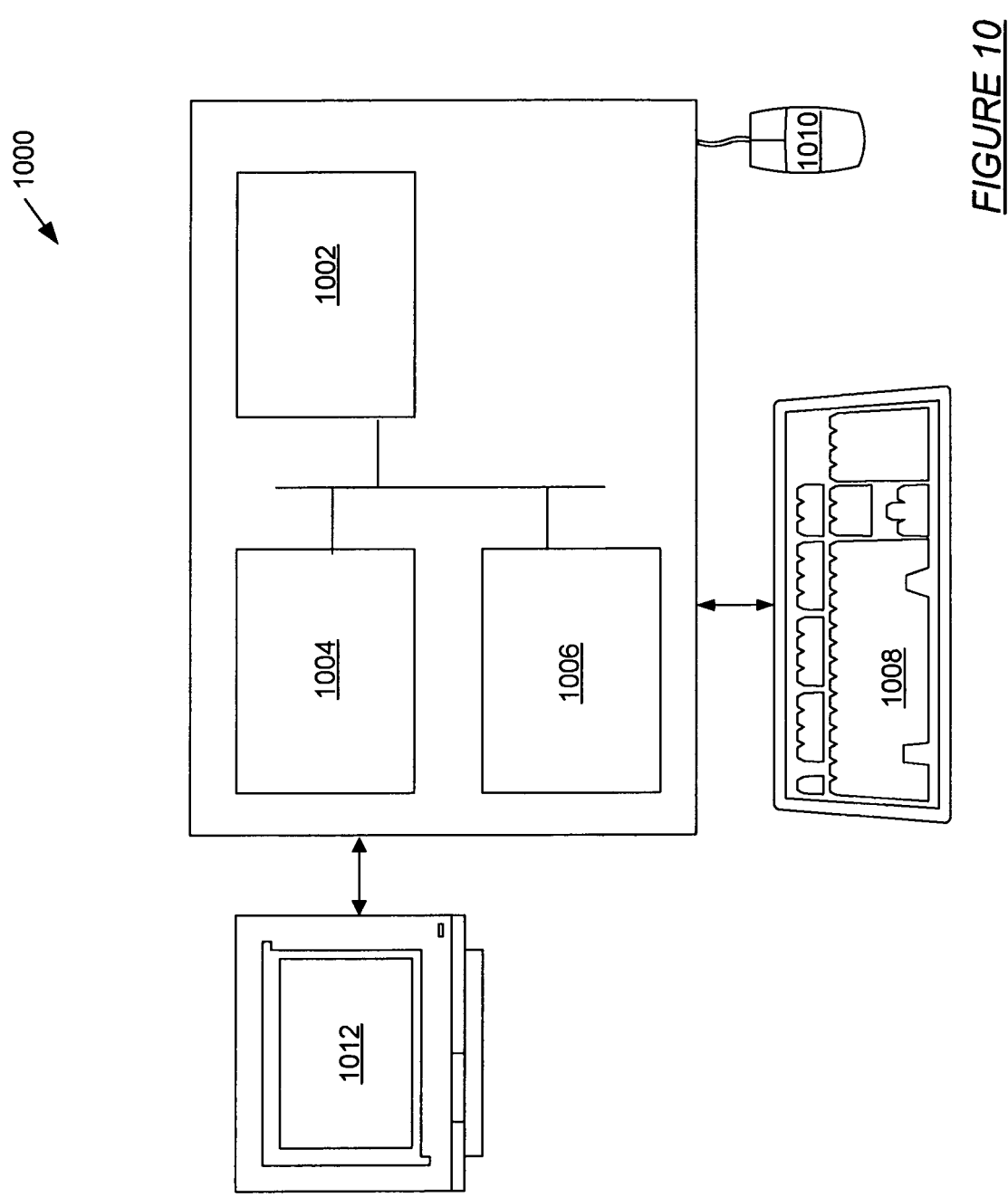

METHOD AND SYSTEM FOR DELEGATED JOB CONTROL ACROSS A NETWORK

BACKGROUND

A datacenter is a facility that physically houses various equipment, such as computers, servers (e.g., web servers, application servers, database servers), switches routers, data storage devices, load balancers, wire cages or closets, vaults, racks, and related equipment for the purpose of storing, managing, processing, and exchanging data and information between nodes. A node is typically either a client or a server within the data center. Datacenters also provide application services and management for various data processing functions.

Datacenters are a unique environment because all the computers and services provided to clients are within a controlled and well-monitored environment. Additionally, datacenters are not static. In other words, datacenters are constantly growing to add additional computers, services, and/or support more users. Therefore, scaling datacenters to increase performance due to the growth of services and users is an ongoing effort.

Due to the dynamic nature of data centers technological solutions have been developed to aid in the management of datacenters. One common approach is to tier management services and locate them in specific locations in the deployment network topology (i.e., a static locations within the datacenter). However, as the network topology within the datacenter changes, for example, the data center is divided into two subnets necessitating the addition of additional routers, the management service must be re-configured and, in some cases, re-deployed, to function in the new topology.

SUMMARY

In general, in one aspect, the invention relates to a method for job delegation. The method comprises receiving a job from a user by a first management object, identifying a target system for the job using a data model in the first management object and a job delegation policy, wherein the data model comprises an object representing the target system, determining a first nexthop for the target system, wherein the first nexthop is a second management object, placing the job on a queue corresponding to the second management object, wherein the queue is located in the first management object, receiving the job by the second management object, locating the target system and a driver corresponding to the target system using the second management object, and executing the job using the driver corresponding to the target system.

In general, in one aspect, the invention relates to a system for job delegation. The system comprises a first management object, wherein the first management object is configure to receive a job from a user, identify a target system for the job using a data model in the first management object and a job delegation policy, wherein the data model comprises an object representing the target system, determine a first nexthop for the target system, wherein the first nexthop is a second management object, place the job on a queue corresponding to the second management object, wherein the queue is located in the first management object. The system also comprises the second management object, wherein the second management object is configured to receive the job, locate the target system and a driver corresponding to the target system using the second management object, and execute the job using the driver corresponding to the target system.

In general, in one aspect, the invention relates to a computer readable medium comprising software code for delegating a job. The software code comprising software instructions to receive a job from a user by a first management object, identify a target system for the job using a data model in the first management object and a job delegation policy, wherein the data model comprises an object representing the target system, determine a first nexthop for the target system, wherein the first nexthop is a second management object, place the job on a queue corresponding to the second management object, wherein the queue is located in the first management object, receive the job by the second management object, locate the target system and a driver corresponding to the target system using the second management object, and execute the job using the driver corresponding to the target system.

Other aspects of the invention will be apparent from the following description and the appended claims.

BRIEF DESCRIPTION OF DRAWINGS

FIG. 10 shows a computer system in accordance with one or more embodiments of the invention.

DETAILED DESCRIPTION

Figure 1A:
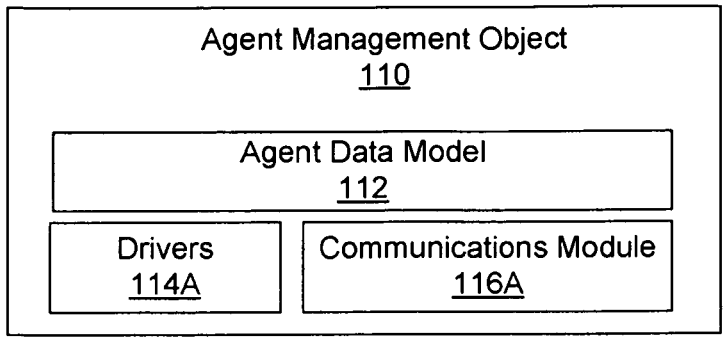
FIGS. 1A-1C show stateless management objects in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system managing a system using systems management objects. More specifically, embodiments of the invention provide a mechanisms for delegated job control across a network using the managed systems objects.

FIG. 1A shows a stateless management object in accordance with one or more embodiments of the invention. More specifically, FIG. 1A shows a agent management object (110), which is one type of stateless management object. The agent management object (110) is an application used to manage systems in a network. The agent management object (110) executes on a managed system (i.e., a device in the network which is associated with a Internet Protocol (IP) address). The agent management object (110) includes drivers (114A) which are used to communicate with systems managed by the agent management object (110). The agent management object (110) also has a communications module (116A) which is used to communicate with other systems management objects in the network topology. The communications module (116A) is configured to receive data from a proxy management object (120, discussed below in FIG. 1B) and to send data to proxy management objects. Said another way, the agent management object (110) includes a 1:1 relationship with a proxy management object. Further, the communications module (116A) typically does not include functionality for the agent management object to communicate with other agent management objects.

In one embodiment of the invention, the agent management object (110) is located in an operating system in a managed system. The agent management object (110) is configured to obtain data about the operating system as well as other components of the managed system on which the operating system executes.

In one embodiment of the invention, the agent management object (110) includes an agent data model (112). The agent data model (112) represents the managed system as a series of objects. For example, the agent data model (112) may include the following objects: an operating system object representing the operating system executing on the managed system, an application object representing an application executing on the operating system, and a hardware component object representing a hardware component of the managed system. Each of the objects in the agent data model (112) includes data about the entity it is representing. This data includes data used by the agent management object to manage the represented entities. The data is obtained using drivers (114A) and/or other functionality in the agent management object (110) configured to interrogate the operating system.

Figure 1B:
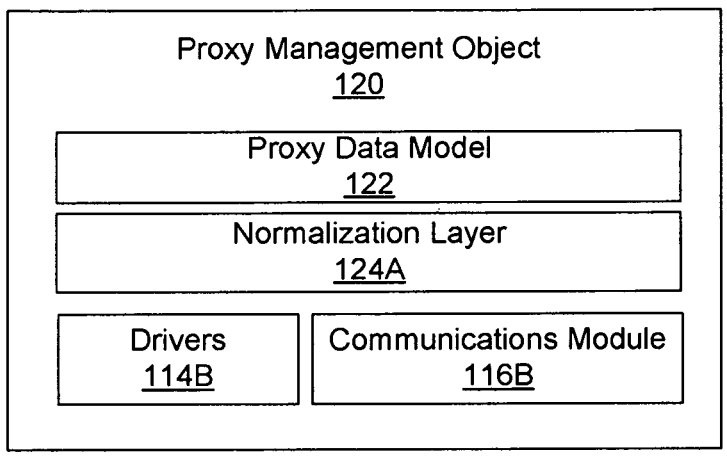

FIG. 1B shows a stateless management object in accordance with one or more embodiments of the invention. More specifically, FIG. 1B shows a proxy management object (120), which is another type of systems management object that executes on a managed system. Similar to the agent management object (110), the proxy management object (120) is an application used to manage systems on a network. The proxy management object may be located on a network devices in a datacenter, such as routers and load balancers.

Some of the components in proxy management object (120) are similar component to the agent management object (110). However, the proxy management object (120) includes additional functionality not present in the agent management object. Specifically, the proxy management object (120) includes drivers (114B) that allow the proxy management object (120) to obtain data about the managed system upon which it is executing and to obtain data about managed systems over a network connection. Further, the proxy management object (120) includes a communications module (116A), which enables the proxy management object (120) to communicate with one or more agent management objects and to communicate with a satellite management object (130). In one embodiment of the invention, there is a many:1 mapping between agent management objects and the proxy management object and a 1:1 relationship with proxy management objects and satellite management objects.

The proxy management object (120) also includes a normalization layer (124A). The normalization layer is configured to receive data from the drivers (114B) and the communications module (116B) to determine which of the received data to propagate to the proxy data model (122). More specifically, if the normalization layer (124A) receives data for a given object (e.g., a hardware component on a managed system) from both the agent management object executing on the managed system as well as a driver (114B) on the proxy management object, the normalization layer includes functionality to determine which of the received data to use. The normalization layer typically uses a normalization model to perform the normalization.

The proxy management object also includes a proxy data model (122). The proxy data model includes objects that represent entities (e.g., hardware components, software components, systems, etc.) which are managed, directly and indirectly, by the proxy management object (120). More specifically, the proxy data model (122) may include the following objects: (i) objects present in the agent data models (112) to which the proxy is connected and (ii) objects corresponding to managed system upon which the proxy management object is executing.

According to one or more embodiments of the invention, the proxy data model may also provide or be used to determine the nexthop for each object represented (discussed below).

In one embodiment of the invention, each proxy management object and each agent management object may also include a listing of one or more driver which may be used to manage/interface each of the entities corresponding to the objects in their respective data models. For example, the object represents a network interface card, then the agent management object includes the necessary drivers to manage/interface with the network interface card.

Figure 1C:
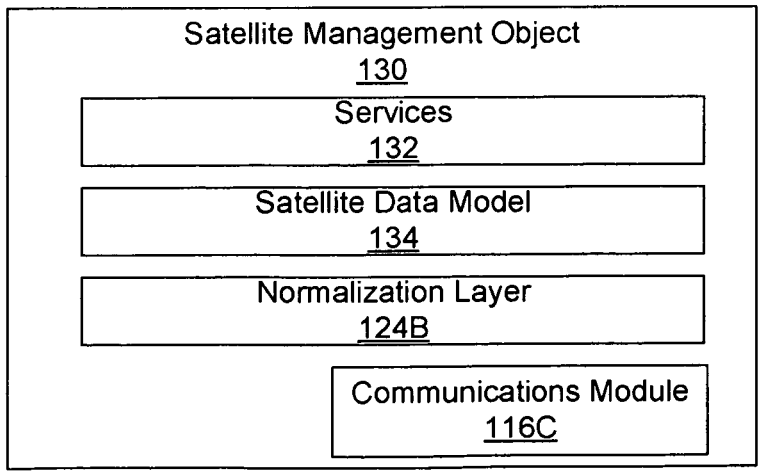

FIG. 1C shows a stateless management object in accordance with one embodiment of the invention. More specifically, FIG. 1C shows a satellite management object (130), which is another type of systems management object that executes on a managed system. The satellite management object (130) includes components similar to the proxy management object and the agent management object; however, the satellite management object includes some additional functionally.

The satellite management objet (130) includes a communications module (116C). The communications module (116C) is used to communicate with other systems management objects (e.g., proxy management object, agent management objects) in the network. In addition, the communications module (116C) may also be configured to communicate with a management user interface (not shown). The management user interface allows a user to communicate with the satellite management object. The satellite management object may then communicate requests, updates, etc. received from the management user interface to other managed systems (via the associated proxy management objects and/or agent management objects) in the network using the communications module (116C).

The satellite management object (130) may communicate with the proxy management objects using a publish/subscribe system (for example a system implemented using Secured Socket Layer (SSL)/Atom Syndication Format and Atom Publishing Protocol (ATOM) in combination with traditional communication techniques). Thus, data from the proxy management objects may be sent to the satellite management object (130) (i.e., pushed from the proxy management objects to the satellite management object). This data may include management data, which is data that allows managed systems in the network to be managed. Further, requests from the satellite management object that are to be communicated to the proxy management objects are placed on appropriate queues within the satellite management object (now shown) to which the proxy objects subscribe. The appropriate management proxies are subsequently notified and pull the request from the satellite management object. The proxy management objects and agent management objects implement a similar communication mechanism to facilitate the transfer request from the satellite management objects to the managed system which are the ultimate targets of the requests.

The satellite management object (130) also includes a normalization layer (124B), which operates in the same manner as the normalization layer (124A) in the proxy management object. Further, similar to the proxy management objects, the satellite management object includes a satellite data model (134). The satellite data model (134) represents entities (hardware components, software components, systems, etc.) which are managed, directly and indirectly, by satellite management object. Similarly to the proxy data model, the satellite data model my also provide a nexthop for each object represented in the data model. Finally, the satellite management object (130) includes services (132). These services (132) allow the satellite management object to discovery the managed systems being managed by the satellite management object (130). The result of the discovery services is additional data about the managed systems, which may then be used for further management of the managed systems. The services may facilitate systems management, such as optimizing power utilization, deployment of software upgrades, deployment of new software, modification of configuration files, or optimizing the rate of data transfer across the network.

With respect to power utilization, the services (132) may be used to, for example, determine (i) resource usage of the various management systems and (ii) application present on the managed systems. The services (132) may then use this information to determine if a process executing on a given managed system may be migrated to another managed system. If the migration can occur, then the satellite management object may initiate the migration and then initiate the powering down in the managed systems after the migration is complete.

In one embodiment of the invention, a given network may include multiple satellite management objects, proxy management object, and agent management objects. Further, network may include a layer of agent management objects each of which are operatively connected to one or more proxy management objects. The proxy management objects may in turn be operatively connected to other proxy management objects and/or satellite management objects.

In one embodiment of the invention, the satellite management object, and proxy management object, and the agent management object communicate with each other using a publish/subscribe model. For example, an agent management object may subscribe to a proxy management object (or more specifically a queue when the proxy management object). Similarly, a proxy management object may subscribe to a satellite management object (or more specifically a queue when the satellite management object). In each of the aforementioned cases, the lower level systems management object (i.e., the agent management object and the proxy management object, respectively) initiate the connection with the higher level systems management objects (i.e., the proxy management object and the satellite management object, respectively) to determine whether there are jobs (discussed below) to pull from the higher level systems management object.

In one embodiment of the invention, the connections are established at one-minute intervals. More specifically, at one-minute intervals a connection is established between, for example, the agent management object and the proxy management object. Once opened, the connection remains open while the agent management object determines whether there are jobs to retrieve from the proxy management object and the jobs (if any, are retrieved). The connection is then closed. Those skilled in the art will appreciate that connections may be opened at shorter or longer time intervals.

In one embodiment of the invention, when a job is initially placed on a job queue, a determination is made about whether the job is a light weight job (i.e., the job consumes less than a pre-defined amount of resources, e.g., a name change operation). In such cases, the light weight jobs are placed in a separate high priority queue (or in a high priority portion of the job queue). In such cases, the connections are established at three-second intervals by a lower level systems object to determine to presence of any light weight jobs. The connection to determine whether there are any light weight jobs once opened, remains open while the job is obtained, executed, and a response is provided the lower level systems object to the higher level systems object. The connection is then closed. Those skilled in the art will appreciate that connections may be opened at shorter or longer time intervals.

Thus, a given systems management object may communicate with another systems management object using two different connection mechanisms: (i) connections for non-light weight jobs and (ii) connections for light weight jobs. The definition of a light weight job may defined on a per-implementation basis.

In one embodiment of the invention, non-light weight jobs are ordered within the job queue based on, for example, priority of the job, type of job, amount of time the job has been in the queue. Further, the systems management objects remove jobs from the front of the job queue for processing.

Figure 2:
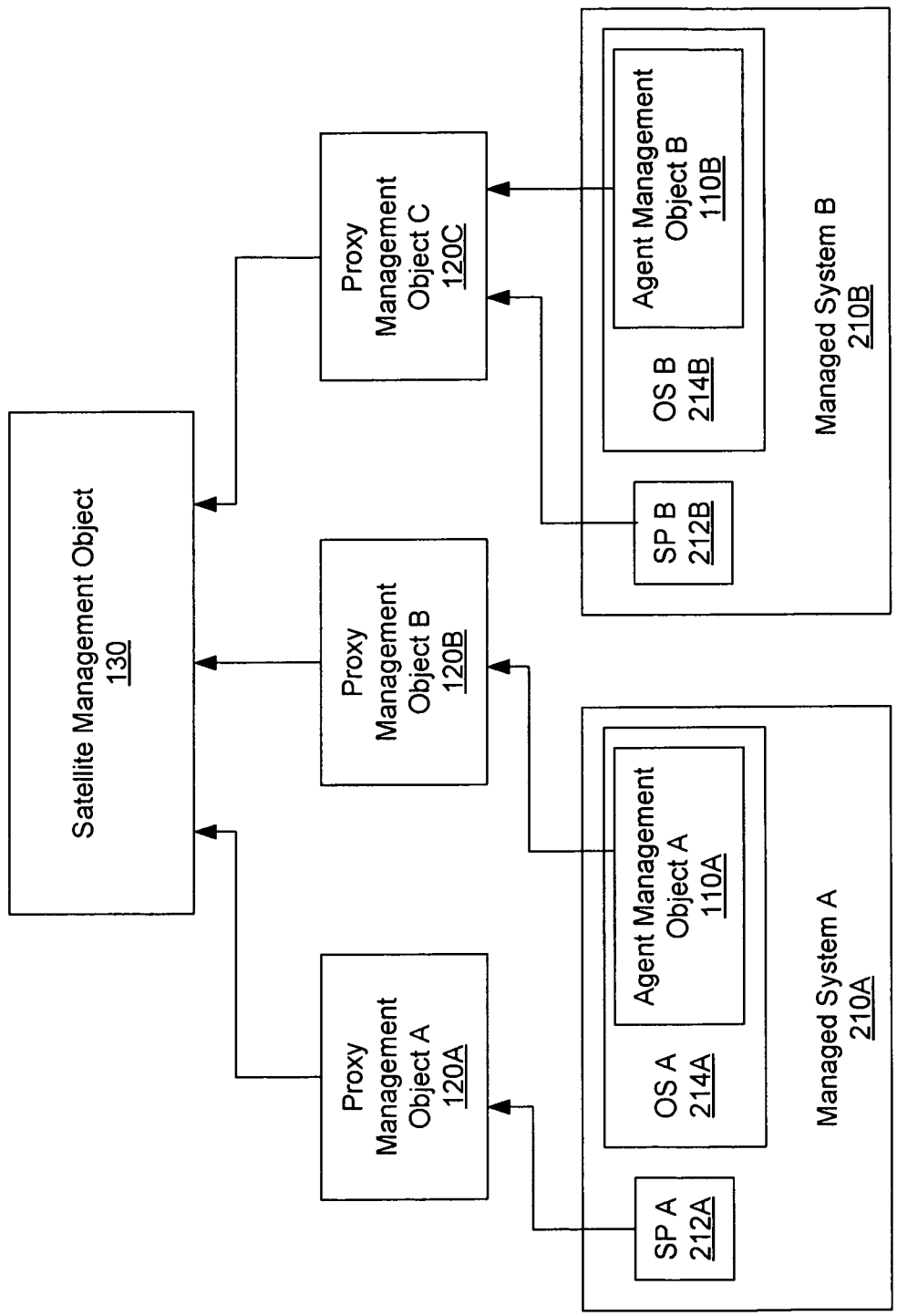
FIG. 2 an example in accordance with one or more embodiments of the invention.

FIG. 2 shows an example in accordance with one or more embodiments of the invention. The example is not intended to limit the scope of the invention. Turning to the example, the system includes a satellite management object (130) operatively connected to three proxy management objects (120A, 120B, 120C). Further, proxy management object B (120B) is operatively connected to agent management object A (110A) and proxy management object C (120C) is operatively connected to agent management object B (110B). Agent management object A (110A) is executing on managed system A (210A) and agent management object B (110B) is executing on managed system B (210B). Each of the managed systems (210A, 210B) include a services processor (212A, 212B) and an operating system (214A, 214B).

As shown in FIG. 2, proxy management object A (120A) is configured to obtain information directly (i.e., without the involvement of agent management object A (110A)) from service processor (SP) A (212A). Further, proxy management object A (120A) is configured to directly (i.e., without the involvement of agent management object A (110A)) manage SP A (212A).

Proxy management object B (120B) is configured to obtain data from agent management object A (110A). More specifically, proxy management object B (120B) obtains data from an agent data model (not shown) populated and maintained by agent management object A (110A). Further, proxy management object B (120B) is configured to directly manage agent management object A (110A). By managing agent management object A (110A), proxy management object B (120B) may indirectly manage operating system A (214A) as well as hardware components (which may include SP A (212A))

managed by operating system A (214A). Finally, proxy management object C (120C) is configured to obtain data directly from managed system B (210B) as well as indirectly via agent management object B (110B).

FIG. 2 shows an example in accordance with one or more embodiments of the invention. The example is not intended to limit the scope of the invention. Turning to the example, the system includes a satellite management object (130) operatively connected to three proxy management objects (120A, 120B, 120C).

Further, proxy management object B (120B) is operatively connected to agent management object A (110A) and proxy management object C (120C) is operatively connected to agent management object B (110B). Agent management object A (110A) is executing on managed system A (210A) and agent management object B (110B) is executing on managed system B (210B). Each of the managed systems (210A, 210B) includes a service processor (212A, 212B) and an operating system (214A, 214B).

As shown in FIG. 2, proxy management object A (120A) is configured to obtain information directly (i.e., without the involvement of agent management object A (110A)) from service processor (SP) A (212A). Further, proxy management object A (120A) is configured to directly (i.e., without the involvement of agent management object A (110A)) manage SP A (212A).

Proxy management object B (120B) is configured to obtain data from agent management object A (110A). More specifically, proxy management object B (120B) obtains data from an agent data model (not shown) populated and maintained by agent management object A (110A). Further, proxy management object B (120B) is configured to directly manage agent management object A (110A). By managing agent management object A (110A), proxy management object B (120B) may indirectly manage operating system A (214A) as well as hardware components (which may include SP A (212A)) managed by operating system A (214A). Finally, proxy management object C (120C) is configured to obtain data directly from managed system B (210B) as well as indirectly via agent management object B (110B).

Though not shown in FIG. 2, the proxy data models populated and maintained by the proxy management objects (120A, 120B, 120C) are communicated to the satellite management object (130) and used to populate a satellite data model (not shown). In populating the satellite data model, the satellite management object (130) may implement a normalization layer (not shown). For example, both proxy management object A (120A) and proxy management object B (120B) may include an object in their respective proxy object models which represents SP A (212A). In this scenario, the satellite management object (130) may use a normalization policy to determine which data (i.e., data from proxy management object A (120A) and proxy management object B (120B)) to use to populate the object representing SP A (212A) in the satellite management object.

Figure 3:
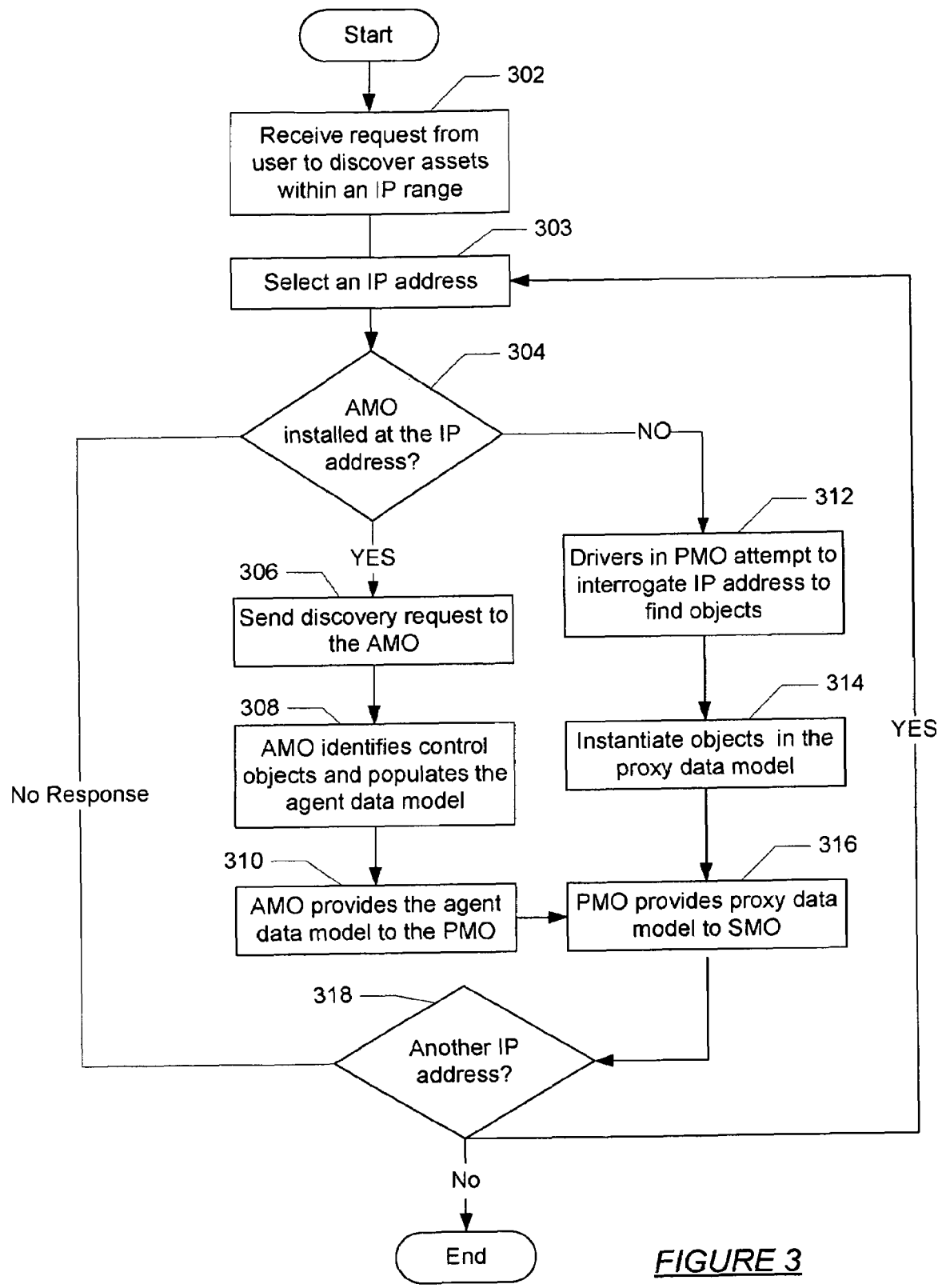
FIG. 3 shows a flowchart in accordance with one or more embodiments of the invention.

FIG. 3 shows a flowchart in accordance with one or more embodiments of the invention. More specifically, FIG. 3 shows a flowchart of a method for discovering assets in a network in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

At 302, a request is received from a user to discover assets within a range of IP addresses. According to one or more embodiments of the invention, the satellite management object (SMO) receives the request and the range of IP addresses via a management user interface. Alternatively, discovery may be triggered automatically by the SMO. At 303, a first IP address in the range on IP addresses is selected. At 304, a determination is made about whether an agent management object (AMO) is installed on the system identified with the IP address. The determination in 304 may be performed by reviewing the satellite data model, by reviewing the appropriate proxy data model, and/or by sending (using TCP/IP) a request to the system and awaiting a response from the system.

If an AMO is present on the system at the IP address, then the method proceeds to 306. At 306, a discovery request is sent to the AMO. As described above, the systems management objects communicate with each other using a publish and subscribe system, such as SSL/ATOM. Accordingly, a request is added to the queue corresponding to the AMO, where the queue is located in a proxy management object (PMO) and/or a SMO.

In one embodiment of the invention, the request is initially placed on a queue corresponding to a PMO. After the PMO retrieves the request, the PMO may place the request on the queue corresponding to the AMO. As discussed above, the AMO subsequently retrieves and processes the request.

Returning to FIG. 3, at 308, the AMO identifies objects that it manages and populates the agent data model appropriately. According to or more embodiments of the invention, the AMO may identify objects it manages by instantiating one or more drivers and then using the drivers to obtain information about the managed system upon which it is executing. The AMO may also include functionality to query the operating system upon which it is executing for information (e.g., configuration information, version numbers, serial numbers, build number, software vendor, manufacturer, OEM information, power management capabilities, etc.) about software components (e.g., applications, operating systems, virtualization software, etc.) and hardware components (e.g., processors, memory, persistent storage, peripherals, network interface cards, etc.) Using the aforementioned information, the AMO subsequently populates the agent data model.

At 310, the AMO provides the agent data model to the PMO (to which it is operatively connected). According to one or more embodiments of the invention, this may be done using the communications modules located in the AMO and the PMO. At 316, the PMO provides an updated proxy data model to the SMO. Those skilled in the art will appreciate that only the updates may be communicated to the SMO and/or the PMO may only send updates to the SMO after a minimum number of updates have been received by the PMO. At 318, a determination is made about whether there is another IP address within the IP range to query. If additional IP addresses exist, the method proceeds to 303. Alternatively, the method ends.

Returning to 304, if no AMO is installed on the system at the IP address then the process proceeds to 312. At 312, drivers in the PMO interrogate the system at the IP address. More specifically, the PMO executing on a remote system (e.g., a system connected over a network connection to the system at the IP address) locates hardware and/or software components in the system at the IP address which may be represented as objects in the proxy data model.

At 314, the identified objects are instantiated into the proxy data model. At 316, the PMO provides the proxy data model (as discussed above) to the SMO. According to one or more embodiments of the invention, by sending data models from the AMO to the PMO, and further to the SMO, the entire system becomes fully inspectable by the systems management objects. The method then proceeds to 318. Returning to 304, if system at the IP address does not respond (i.e., the PMO or SMO) cannot ascertain whether that the system at the IP address does or does not have an AMO, then the process proceeds to 318. The aforementioned steps are repeated until all IP addresses in the range of IP addresses are interrogated.

Figure 4:
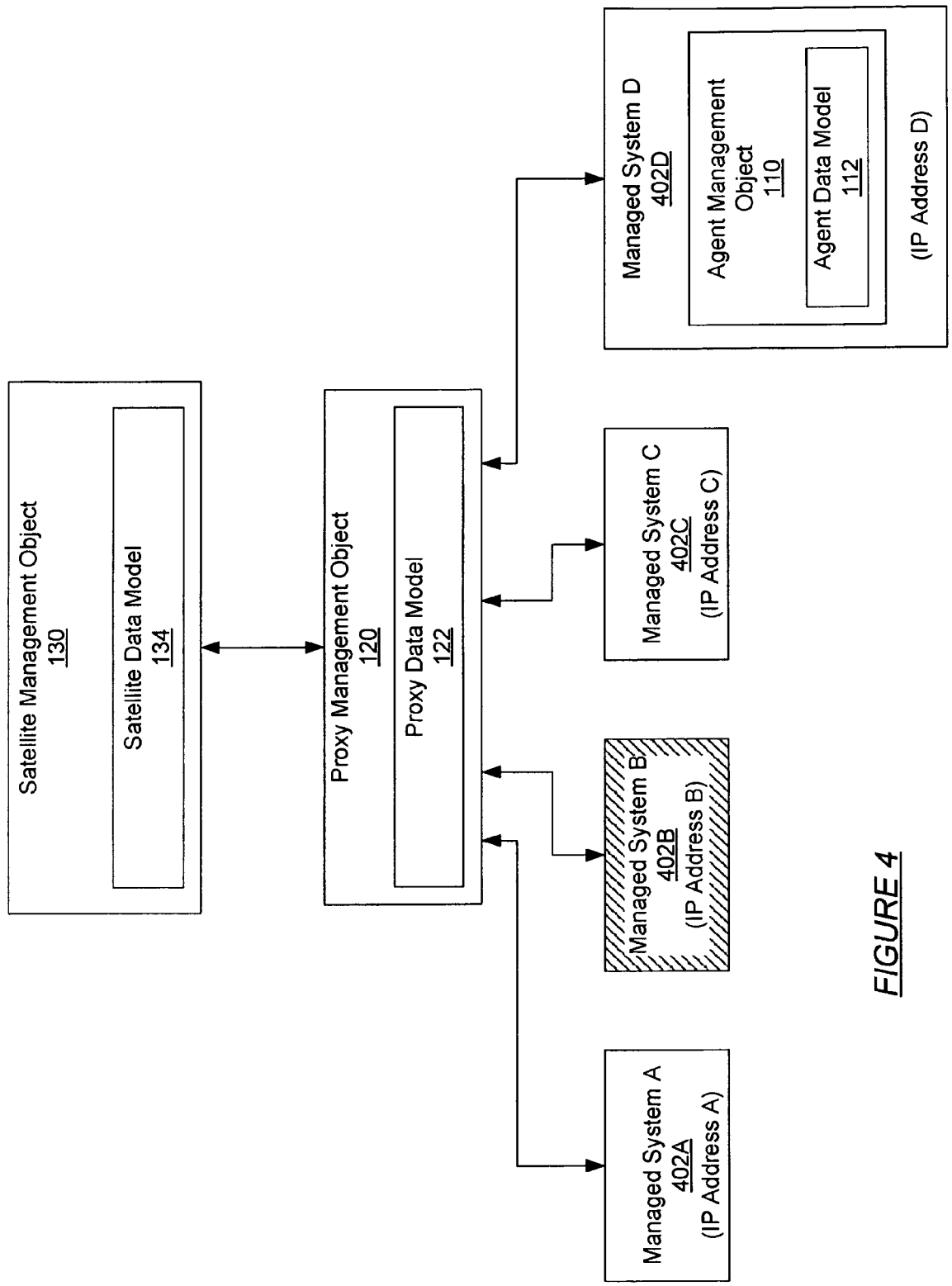
FIG. 4 shows a system in accordance with one or more embodiments of the invention.

FIG. 4 shows an example in accordance with one or more embodiments of the invention. More specifically, FIG. 4 shows an example of using the method shown in FIG. 3. The following example is not intended to limit the scope of the claims.

Turning to the example, a request for discovery is initially received by the satellite management object. It is important to note that discovery may occur at any level, but for purposes of this example the request is sent to the satellite management object (130). The request includes the following IP address range: IP address A-IP address E. Those skilled in the art will appreciate that the IP address range may be specified in any manner without departing from the invention. Upon receipt of the request, the satellite management object (130) determines that the proxy management object (PMO) (120) is the only (PMO) within the IP address range. Accordingly, the SMO (130) queries the PMO (120) to obtain its proxy data model. At this stage, the PMO (120) may already have an up-to-date proxy data model and, accordingly, once the SMO (130) receives the proxy data model, the discovery of managed systems in the IP address range is complete.

However, if the PMO (120) does not include an up-to-date proxy data model, the PMO attempts to interrogate IP addresses in the range to find managed systems. Specifically, the PMO (120) sends requests to IP addresses A-E, and receives back responses from managed systems A, C, and D. Managed system B, while in the IP address range is currently powered down and, accordingly, does not respond to the request. Further, the PMO (120) determines that managed system D (402D) includes an agent management object (AMO) (110).

Based on the above responses, the PMO (120) queries managed systems A and C (402A, 402C) to determine hardware and/or software components to represent as objects in the proxy data model (122). Further, the PMO (120) obtains the agent data model (112) from the AMO (110) executing on managed system D (402D).

After the proxy data model (122) has been populated with objects representing hardware and/or software components in managed system A (402A), managed system B (402B), and managed system D (402D), the PMO (120) communicates the proxy data model (122) to the SMO (130). Those skilled in the art will appreciate that some networks may include multiple levels of PMOs. In such cases, the PMO (120) might communicate the proxy data model (122) to one or more other PMOs (not shown) before the proxy data model (which may also include objects from the intervening PMOs) is communicated to the SMO (130).

Figure 5:
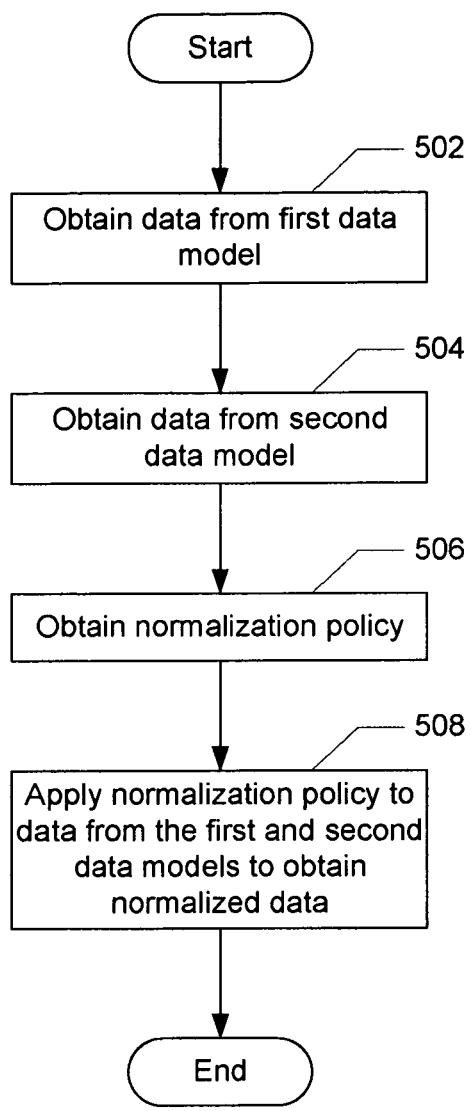
FIG. 5 shows a flowchart in accordance with one or more embodiments of the invention.

FIG. 5 shows a flowchart in accordance with one or more embodiments of the invention. Specifically, FIG. 5 shows a flowchart of a method for normalizing in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

At 502, a first data model is received from a systems management object. According to one or more embodiments of the invention, the systems management object may be an agent management object or a proxy management object, and may be received a proxy management object or a satellite management object. Similarly, at 504, a second data model is received for another systems management object.

At 506, a normalization policy is obtained. According to one or more embodiments of the invention, this policy may be stored in the proxy management object or the satellite management object. The normalization policy may change depending on the needs of the user. For example, if the user is managing the system for power management, this will affect the method of managing that object and the normalization policy will be configured to normalize the data accordingly. In particular, the normalization policy favor sources of data which are more accurate with respect to resource usage and/or power consumption. Said another way, if two sources provide data about the same hardware component but one source is considered to provide more accurate information with respect to resource usage and/or power consumption, then this source is favored over the other source.

At 508, the normalization layer applies the normalization policy to data from the first and second data models to obtain normalized data. The normalized data is then used to populate the appropriate proxy data model or satellite data model.

Figure 6:
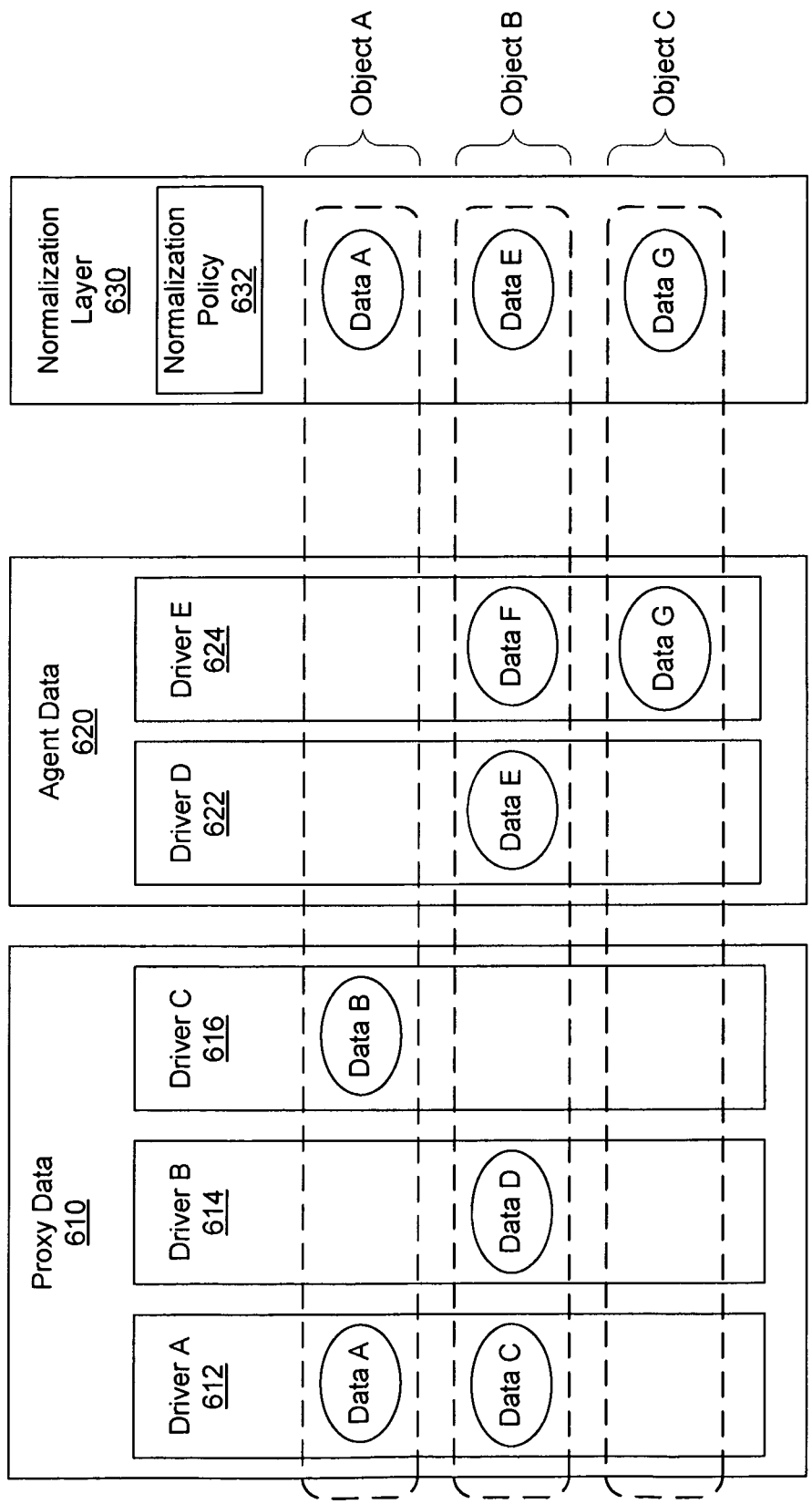
FIG. 6 shows a system in accordance with one or more embodiments of the invention.

FIG. 6 shows an example in accordance with one or more embodiments of the invention. The example is not intended to limit the scope of the invention. In the example shown, the normalization layer (630) receives data from a proxy management object (610) and from an agent management object (620).

The data received from the proxy management object (610) includes information from Driver A (612), Driver B (614), and Driver C (616). Driver A provides Data A about Object A and Data C about Object C. Driver B also is able to obtain data (Data B) about Object B. Finally, Drive C is able to obtain data (Date B) about Object A.

The normalization layer (630) also receives data from an agent management object (620). The data from the agent management object includes information obtained from Driver D (622) and Driver E (624). Driver D provides Data E about Object B, and Driver E provides Data F about Object B and Data G about Object C.

After receiving the proxy data (610) and the agent data (620), the normalization layer normalizes the data. As shown, the normalization layer determines which of the sources to use to populate each object. As shown in FIG. 6, Data A and Data B are shown to correspond to the same object. Similarly, Data C, Data D, Data E, and Data F are shown to correspond to a second Object. Finally, Data G is shown to be the only data received that corresponds to a third object.

The normalization layer (630) uses a normalization policy (632) to determine how data is normalized. For example, if a user is managing a system for power management purposes, it may be beneficial to manage the first object using Data A rather than Data B. Accordingly, Data A is chosen. Similarly, Data E is chosen for the second object. Finally, Data G is the only data received by the normalization layer for the third object and, accordingly, Data G is used to populate object C. According to one or more embodiments of the invention, the normalized data may now be used to create a data model for the systems management object that includes the normalization layer (630).

The following is another example of how the normalization layer may be used to normalize data from multiple sources. Turning to the example, consider a scenario in which a managed system includes a Lights Out Management (LOM) module. The LOM module may be discovered by a proxy management object using direct network access. In addition, the LOM module may be discovered using an agent management object executing on the operating system within the managed system using system calls. The normalization layer located in the proxy management object may obtain data about the LOM module from both the proxy management object and the agent management object. Upon receipt of this data, the normalization layer, using a normalization policy, determines which data (i.e., data from the proxy management object and data from the agent management object) to use in the proxy data model.

In one embodiment of the invention, the service management objects may be placed on systems within the network at any point in time. Once a service management object is placed on a system in the network, the service management object attempts to locate other service management objects. For example, if an agent management object is placed in the network, the agent management object may attempt to locate proxy management objects and/or satellite management objects with which to communicate.

The agent management object, upon locating other system management objects, may query the system management object to determine whether the system management object includes any objects in its data model which describes the system upon which the agent management object is executing. Using this information along with information obtained from the system directly, the agent management object may then generate an agent data model. The agent data model may be subsequently be used to update the data models on other system management objects.

Further, if a proxy management object is deployed on a system in the network, the proxy management object may attempt to locate both agent management objects and satellite management objects. The proxy management object may subsequently use the located satellite management objects and agent management objects to populate the proxy data model. The proxy management object may concurrently attempt to populate its own proxy data model using its own drivers.

Using the above functionality, systems management objects may be deployed through out the life cycle of the datacenter and, in the event a proxy management object is removed or fails, the remaining systems management objects may reconfigure their communications paths using, for example, the discovery mechanism shown in FIG. 3. Further, regardless of which system management objects are present in the network at any given time, the normalization layer may be used to provide a consistent view of the objects being managed within the network.

In one embodiment of the invention, the asynchronous communication protocols (e.g., SSL/ATOM) allow the systems management objects to communicate in network without monopolizing bandwidth within the network.

As discussed above, objects in the proxy data models and the satellite data models include nexthops. The nexthop for an object corresponds to the next systems management object on the path between the current managed system and the system upon which the entity corresponding to the object is located. For example, if an object representing a hardware component is located in a satellite data model, the nexthop for the object may be a managed system that includes a proxy management object where the proxy management object is (i) able to manage the hardware component over a network connection; (ii) on the managed system of which the hardware component is a part; (iii) operatively connected to an agent management object which is executing on the managed system of which the hardware component is a part; or (iv) operatively connected to another proxy management object which is (i), (ii), (iii). This example is not intended to limit the scope of the invention.

In one embodiment of the invention, the nexthop for an object may be dynamically modified based on the quality of service of the nexthop and/or the path in which the nexthop is located. Specifically, when messages (which include, but are not limited to, jobs and corresponding notifications) are transmitted between various tiers in the management system (e.g., between satellite management objects, proxy management objects, and agent management objects) the following information is recorded: (i) size of packet, (ii) time elapsed to deliver the packet, and (iii) number of retires to send packet.

The above information may then be used to determine a quality of service (QoS) for an object in a data model in a given systems management object. The QoS may be determined using the following equation: (size of packet/time elapsed to deliver packet)*number of retries. The lower the resulting value the higher the QoS.

The QoS for a object is then observed over a period of time to determine a trend value for the QoS. Those skilled in the art will appreciate that a trend value for the QoS may be determined using well known statistical techniques. Once a trend value (e.g., an average QoS value is determined, the trend value is stored in the object with which the message is associated.

The QoS may then continue to be monitored for the object and if the QoS of the object drops below a QoS threshold (which may be determined by the trend value), e.g., a range of acceptable QoS values, an lower limit of the QoS value (i.e., a minimum QoS required), the systems management objects may be queried to determine a more acceptable nexthop for the object. Specifically, the satellite management object and/or a proxy management object then queries other systems management objects in the network to determine which other proxy management objects indicate reach-ability to the IP address (with which the object is associated) or an agent management object (in whose data model the object is associated).

The QoS of the proxy management objects that indicate reach-ability to the object are then compared with each other and the existing proxy management object (i.e., the proxy management object which is currently managing the object). Based on the comparison, the proxy management object with the highest QoS (i.e., best relative QoS) is selected. The satellite management object then updates is normalization tier to indicate that the newly selected proxy management object should be used.

Figure 7:
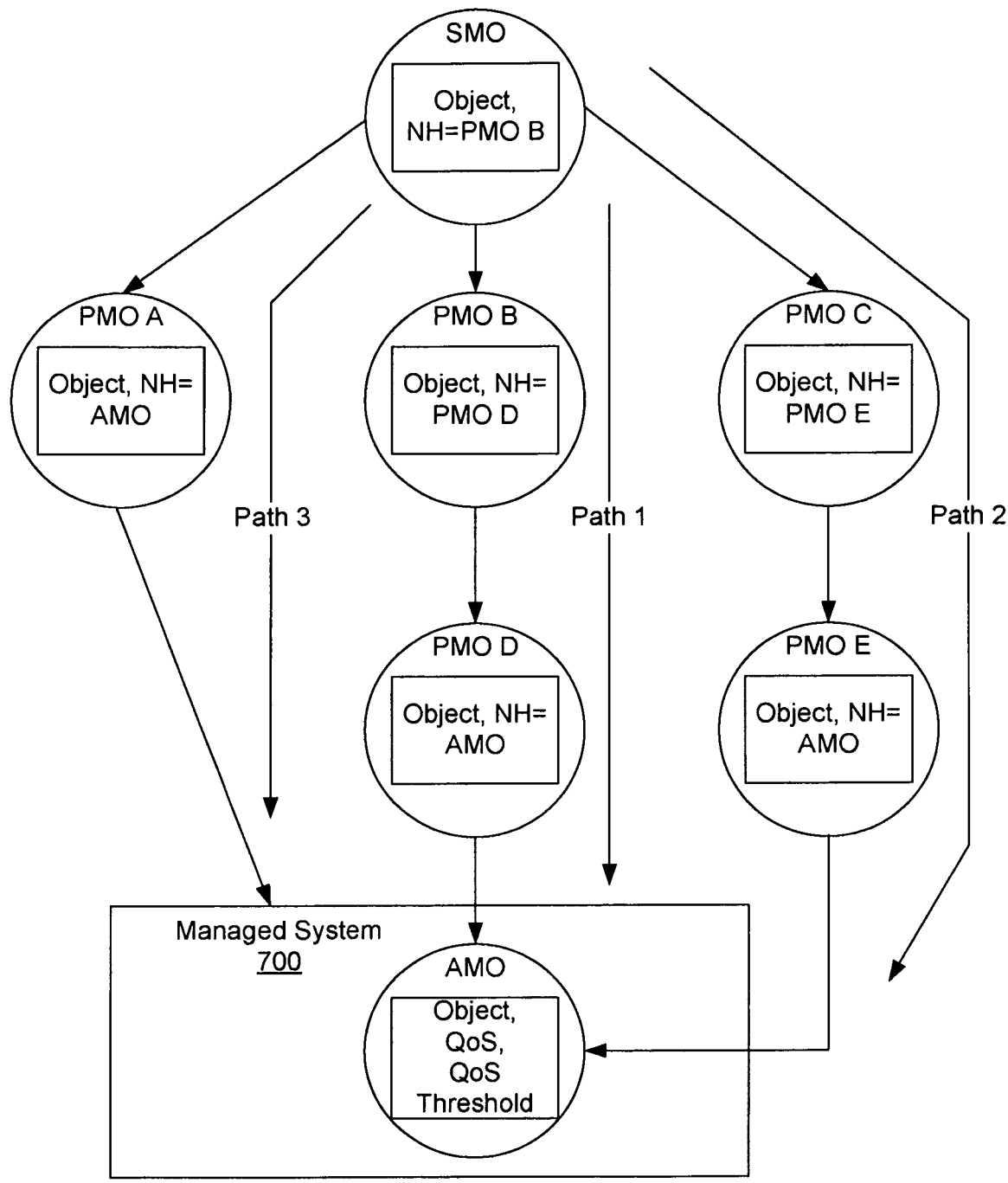
FIG. 7 shows an example in accordance with one or more embodiments of the invention.

FIG. 7 shows an example in accordance with embodiment of the invention. As shown in FIG. 7, the system includes a satellite management object (SMO), a number of proxy management objects (PMO A, PMO B, PMO C, PMO D, PMO E), an agent management object (AMO), and a managed system (700).

Initially, jobs from the SMO are communicated to the object in the AMO over path 1. As shown, each systems management object in path 1 includes the object (which is located in the data model of the systems management object (not shown)) along with a nexthop (NH value). Using the NH values the job is communicated from the SMO to the object in the AMO. In addition, the QoS for jobs communicated over path 1 are calculated and stored along with the object in the AMO. In addition, the AMO also includes a QoS threshold for the object. As discussed above, the QoS threshold may correspond to the minimum acceptable QoS specified for the object. Those skilled in the art will appreciate that the QoS threshold may be same for all objects in the AMO.

Continuing with the discussion of FIG. 7, assume that the QoS for the object drops below the QoS threshold. In such cases, the SMO may automatically attempt to find another path to the object in the AMO which satisfies the QoS threshold for the object. As discussed above, the SMO may initially determine which PMOs can reach the object in the AMO. In FIG. 7, PMO A and PMO C can each reach the object. The SMO then proceeds to determine the QoS for jobs issued to each of the aforementioned PMOs. In FIG. 7, jobs issued to PMO A would follow Path 3, while jobs issued to PMO C would follow Path E. Once the QoS for each path is determined, they are compared with the QoS of path 1. If the QoS for path 1 is better than the QoS for either path 2 or path 3, then there is no change in path for transmitting jobs to the object in the AMO. However, if either path 2 or path 3 have higher QoS values than path 1, the SMO is reconfigured to use the path with the best relative QoS.

The configuration may include updating the NH in the object stored in the SMO to point to the appropriate PMO. In addition, the normalization policy may be updated to reflect that data from the PMO now designated as the NH for the object should be used.

Figure 8:
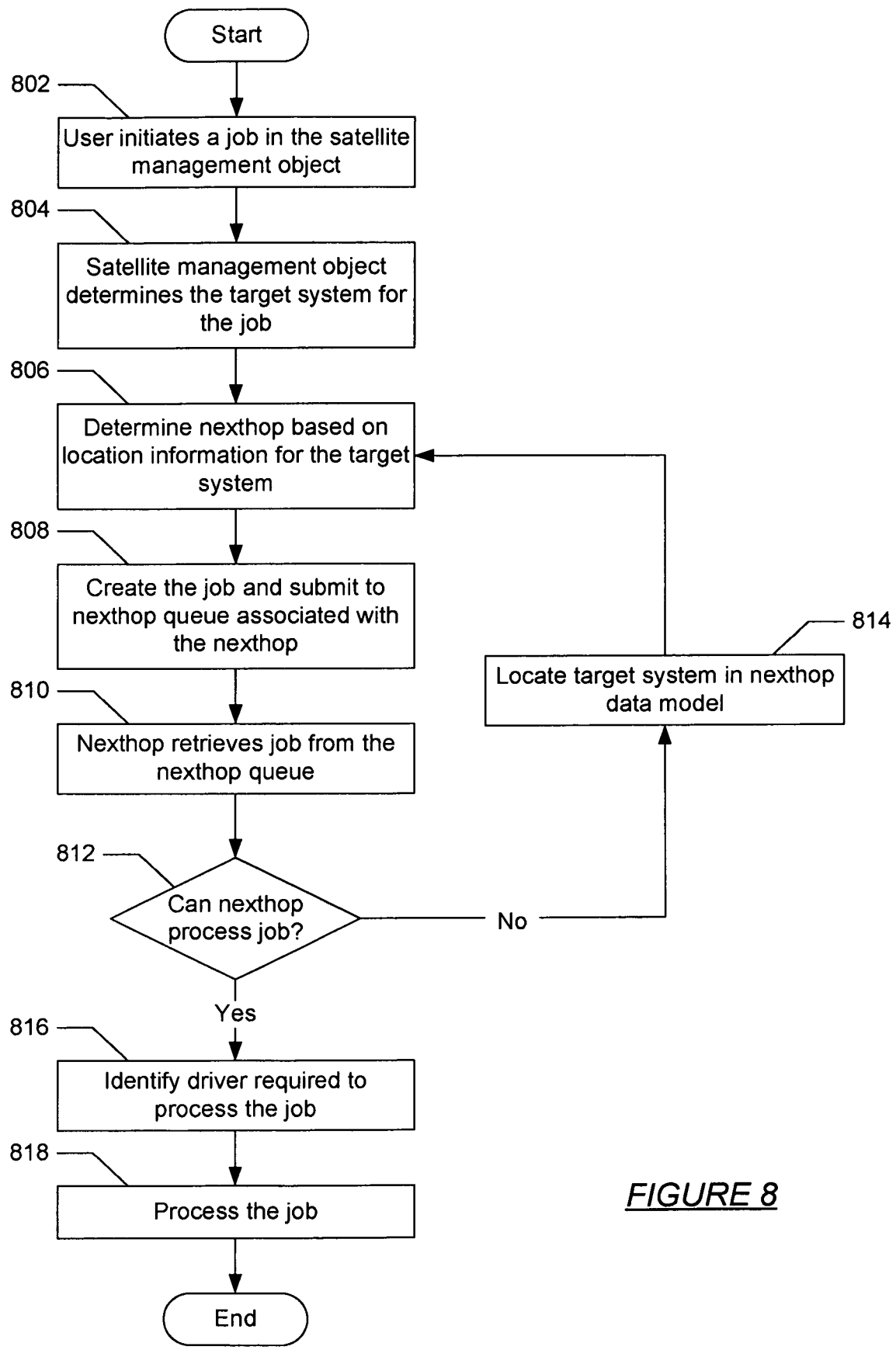
FIG. 8 shows a flowchart in accordance with one or more embodiments of the invention.

As discussed above, the nexthops allow jobs to be communicated from the SMO to the appropriate PMO and/or AMO. FIG. 8 shows a flowchart in accordance with one or more embodiments of the invention. More specifically, FIG. 8 illustrates a method for delegating a job in a network. While the various steps in this flowchart are presented and described sequentially, one of ordinary skill will appreciate that some or all of the steps may be executed in different orders, may be combined or omitted, and some or all of the steps may be executed in parallel.

At 802, a user initiates a job in the satellite management object. According to one or more embodiments of the invention, the user may also use the satellite management object to start jobs, stop jobs, suspend jobs, and resume jobs.

At 804, the satellite management object determines the target system for the job. According to one or more embodiments of the invention, a single job (e.g., apply operating system security patch) may need to be performed on a number of managed systems in the network. The managed system upon which the job is to be completed is referred to a the target system. The target system(s) may be determined using the satellite data model. More specifically, a job delegation policy may be used to identify possible target systems and to select one or more of the target systems to which the job is sent.

At 806, the satellite management object determines the nexthop for the target system. According to one or more embodiments of the invention, the nexthop may be identified using the satellite data model in the satellite management object. Further, according to one or more embodiments of the invention, the nexthop may be a second systems management object, such as a proxy management object or an agent management object.

At 808, the satellite management object creates the job and submits it to the nexthop queue associated with the nexthop. According to one or more embodiments of the invention, the satellite management object may be operatively connected to a number of other systems management objects, such as proxy management objects and agent management objects. The satellite management object may include a queue for each of the systems management objects to which it is operatively connected.

At 810, the second systems management object retrieves the job from the nexthop queue. The satellite management object and the second management object communicate using a publish and subscribe method, such that the second systems management object pulls the job from the queue in the satellite management object.

At 812, the second systems management object determines if it can process the job. Specifically, the second systems management object determines whether it is managing the target system (or component which is the target of the job)

At 816, if the second systems management object is managing the target system (or component which is the target of the job), the second systems management object identifies the driver required to process the job. The second systems management object may identify the driver by referring to the data model in the second systems management object.

At 818, the second systems management object processes the job using the identified driver. Though not shown in FIG. 8, once the job can been executed the second systems management object issues a notification. In one embodiment of the invention, the notification is communicated to the satellite management object using a publish/subscribe mechanism similar to one used to transmit the job from the satellite management object to the second systems management object. In such cases, the second systems management object includes a queue for the satellite management object to which the satellite management object subscribes. Once the notification is placed in the aforementioned queue, the satellite management object pulls the notification from the queue. In one embodiment of the invention, the notification includes a unique identification correspond to the job.

Returning to 812, if the second systems management object is unable to process the job, then the flowchart continues at 814. At 814, the second systems management object identifies the target system in the data model located in the second systems management object. Then at 806, the second systems management object identifies the nexthop to the target system from the second management object. According to one or more embodiments of the invention, the nexthop from the second management object is a third systems management object.

The flowchart continues at 808, where the second management object creates the job and submits it to a queue associated with the third management object. The process continues until a systems management object is encountered that can process the job, at which point the driver is identified and the job is processed.

Figure 9A:
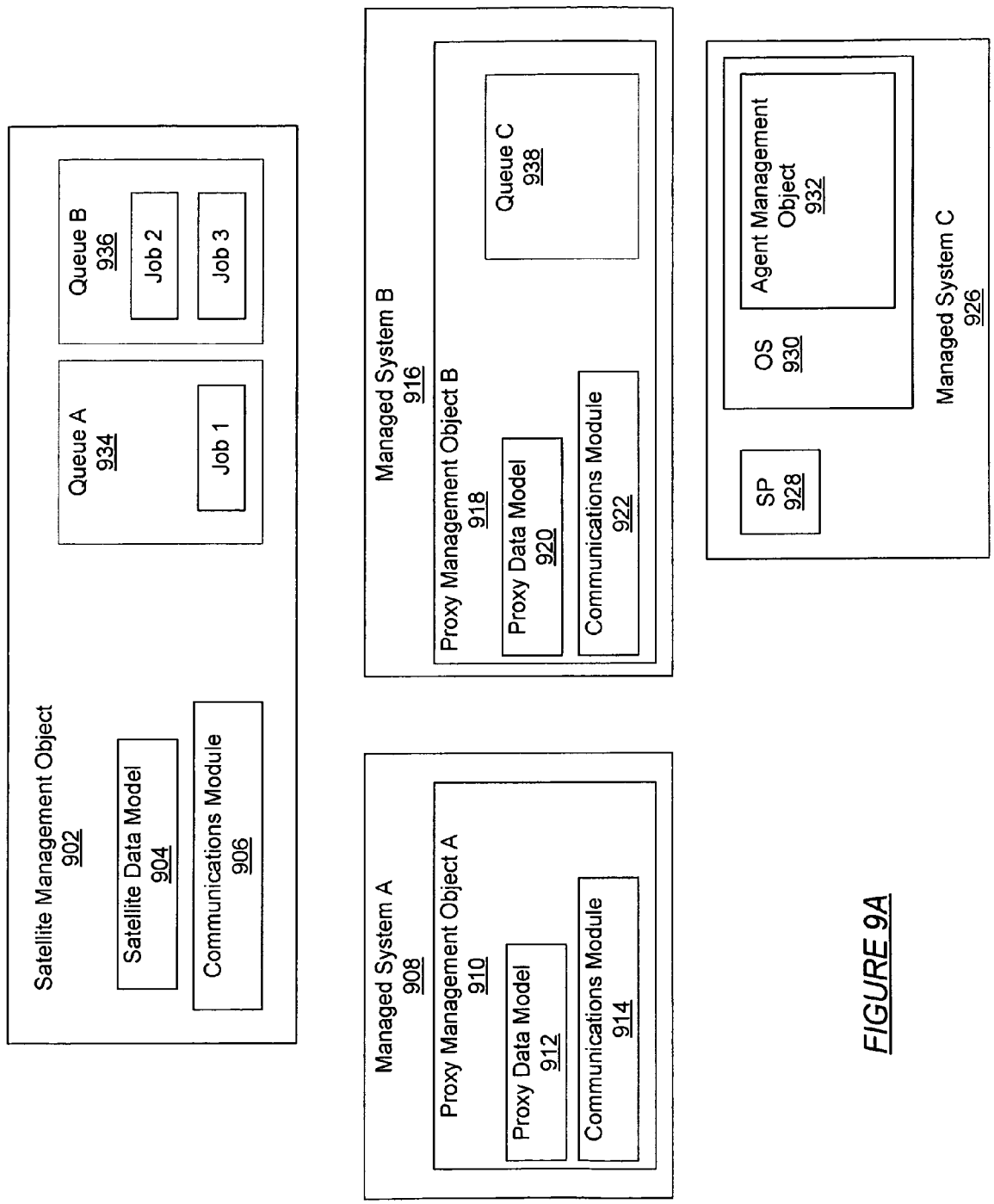
FIG. 9A-9C show an example in accordance with one or more embodiments of the invention.
Figure 9B:
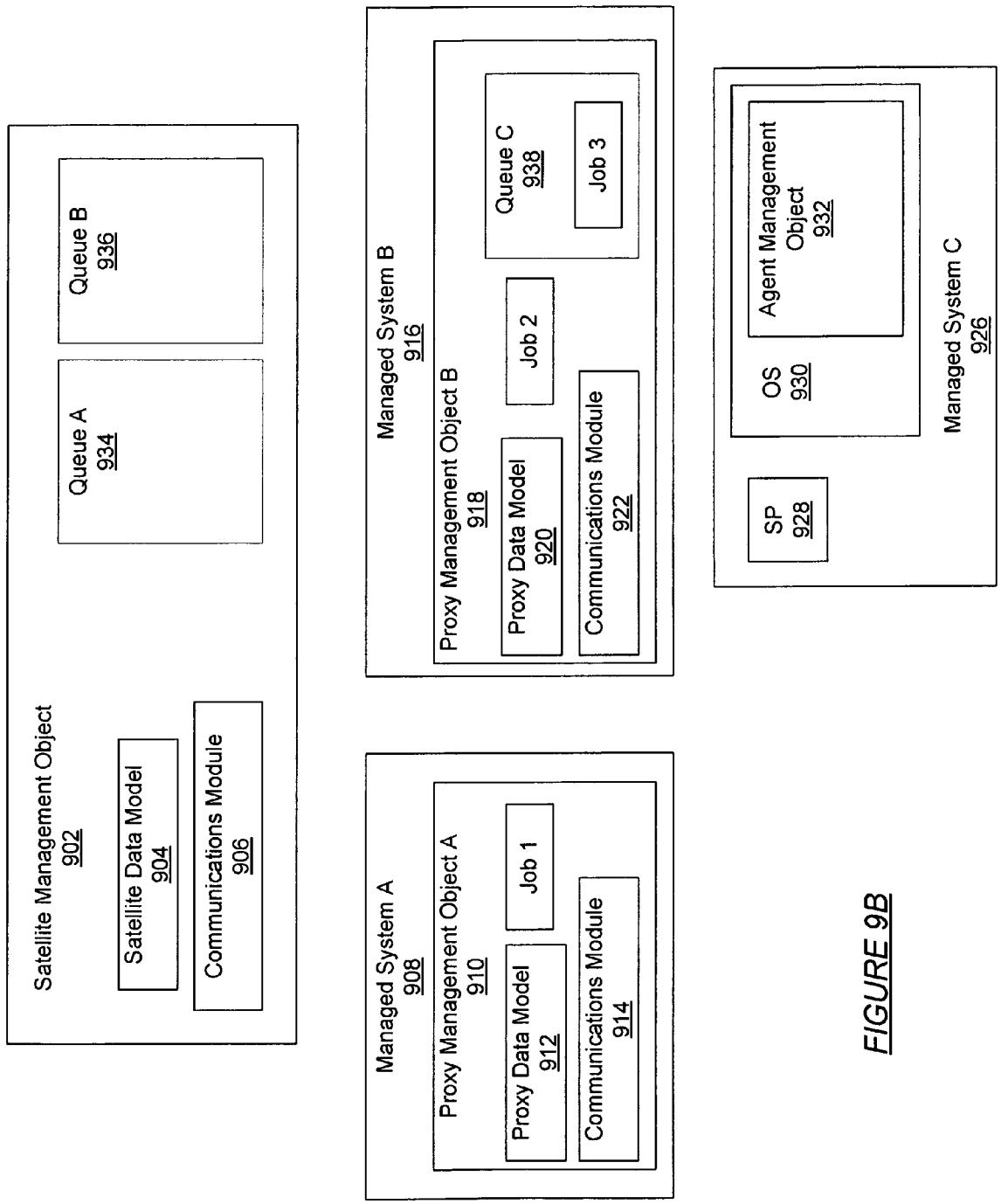
Figure 9C:
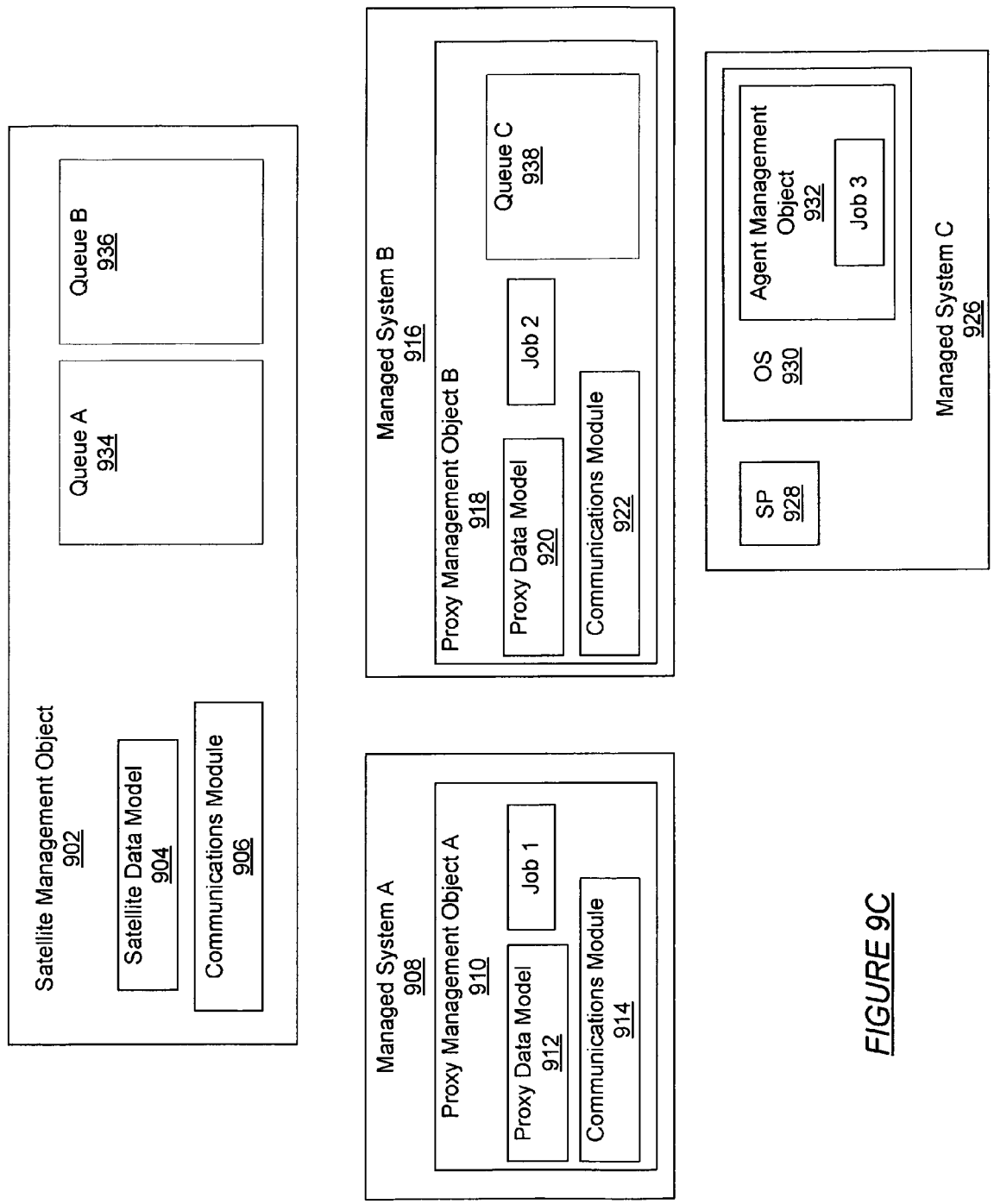

FIG. 9A-9C show an example in accordance with one or more embodiments of the invention. The example is not intended to limit the scope of the claims. The example shows a satellite management object (902), managed system A (908), managed system B (916), and managed system C (926).

Satellite management object (912) includes a satellite data model (904) and a communications module (906). Other components of the satellite management object have been omitted for clarity of the example. In addition, the satellite management object (912) includes queue A (934) and queue B (936). These queues are subscribed to proxy management object A (910) and proxy management object B (918), respectively.

Proxy management object A (910) is located on Managed system A (908) and includes a proxy data model (912) and a communications module (914). Similarly, proxy management object B (918) is located on managed system B (916) and includes a proxy data model (920), a communications module (922), and queue C (938). Queue A (938) which is subscribed to by agent management object (932). Agent management object (932) is located in a operating system (930) on managed system C (926). Managed system C (926) further includes a service processor (SP) (928). Though not shown, the agent management object (932) includes an agent data model and a communications module.

For purposes of this example, assume that the satellite management object has issued three jobs (Job 1, Job 2, Job 3), where the target system of Job 1 is managed system A (908), the target system of Job 2 is managed system B (908), and the target system of Job 3 is managed system C (908).

In the example shown, the jobs have already been delegated to queues in the satellite management object (902). However, it is important to note that before the jobs are delegated to queues, the satellite management object (902), as discussed above, first determines a target system for each of the jobs, as well as a nexthop for each of the jobs. The nexthop for each job determines in which queue the job is placed. As discussed above, the target system and nexthop for each job are determined using the satellite data model (904). In the example shown, Job 1 has been delegated to queue A (934), while Job 2 and Job 3 have been delegated to queue B (936).

Referring to FIG. 9B, as discussed above, managed system A (908) subscribes to queue A (934) and managed system B (936) subscribes to queue B (936). Accordingly, managed system A (908) pulls Job 1 from queue A (934) while managed system B (916) pulls jobs 2 and 3 from queue B (936). In this example, job 1 may be processed by proxy management object A (910). Accordingly, proxy management object A (910) obtains the appropriate driver to process job 1 and then proceeds to process job 1. Similarly, job 2 may be processed by proxy management object B (918). Accordingly, proxy management object B (918) obtains the appropriate driver to process job 2 and then proceeds to process job 2. However, proxy management object B (918) determines it cannot process job 3. Accordingly, proxy management object B (918) determines the nexthop for job 3. In this example, the nexthop is determined to by the agent management object (932). Accordingly, job 3 is placed in queue C (938) to which the agent management object (932) subscribes.

Referring to FIG. 9C, job 3 is subsequently retrieved from queue C (938) by the agent management object (932). The agent management object (932) then proceeds to locate the appropriate driver to process the job and then processes the job using the appropriate driver. According to one or more embodiments of the invention, proxy management object A (909), proxy management object B (919), and the agent management object (932) may subsequently communicate to the satellite management object (902) using the communication modules that the jobs have been processed.

As discussed above, the satellite management object may issue jobs to one or more of the managed systems. Each of these jobs is defined by an eXtensible Markup Language (XML) descriptor which may be viewed by a user interfacing with the satellite management object (or other systems management objects). Further, once a job has been issued a user may be suspend, stop, and resume. When a job is stopped, the state of entity on which the job was operating (e.g., the state of an application for which the job was applying an upgrade) is rolled back to the state prior the initiation of the job. The job is then placed in a suspended state. The user may then resume the job at a later point in time. Further, once the state of the entity is rolled back, the entity is released (i.e., the entity is no longer locked).

In one embodiment of the invention, a given job may include one or more tasks, where each task is an atomic operation (i.e., single operation with only two possible outcomes: success or failure). If a job includes multiple tasks, the tasks in the job may be performed in parallel, in a specified sequence, or a combination thereof. The order (if any) in which the task are executed is specified with the job.

The following is an example of a job that includes a number of tasks. The example is not intended to limit the scope of the invention. Turning to the example, consider the scenario in which a job is issued to retrieve the operating temperature for System A, where the job includes four tasks managed by a driver on a proxy management object: (i) get core sensor temperature; (ii) get fan sensor temperature; (iii) get PSU sensor temperature; and (iv) average return values of (i), (ii), and (iii).

In this case all of the tasks are managed on a proxy management object that includes the driver to the target system A. Accordingly, the job is transmitted to the proxy management object using the publish/subscribe mechanism described above. The proxy management object, upon receipt of the job, may perform tasks (i), (ii), (iii) in series or in parallel. Once tasks (i)-(iii) are performed, task (iv) is performed, and the result returned to the satellite management object.

In another example, consider a scenario in which the user requests: "Install Patch 1234" on all systems with operating system X. In this example, the satellite management object first determines all of the systems executing OS X and then creates a job for each identified managed system. The jobs are then submitted to proxy management object and ultimately to the agent management object executing in OS X. The agent management object then installs the patch and reports the result to the satellite management object. In this example, the jobs may all be sent down to the agent management object for processing in parallel, with the agent management objects responding, asynchronously, with a success/failure to the user (via the satellite). Further, in this case, because there is no relationship between the individual systems job flow, a failure on managed system to install the patch will not cause a rollback on changes in the other identified managed systems.

The following is another example of the invention. In this example, a job is issued to provision an operating system (OS) on a managed system. The provisioning requires the orchestration of control between the service processor to perform Lights Out Management (LOM) tasks, such as reboot, configure for netboot and configuring the Media Access Control (MAC) address as well as issuing commands to the managed system to deploy the OS. This however is only one job because all of the tasks must be executed in a specific order and failure of any task will affect the ability of the next task to succeed.

For the purposes of this example, assume that there are two proxies, proxy management object A and proxy management object B. Proxy management object A has an iLOM driver loaded and is communicating with the service processor on the managed system. Further, Proxy B management object includes an OS Provisioning driver loaded and is communicating with the data port (e.g., a network interface card) on the managed system.

In this example, the job is managed by a satellite management object with which the two proxies are communicating. In one embodiment of the invention, the job is managed by a systems management object with visibility of all managed systems (or portions thereof) upon which a job is executed. In this case, the proxy management object A and proxy management object B do not individually have visibility of the entire managed system. Accordingly, the job is managed by the satellite management object. The satellite management object may queue pseudo jobs to represent the tasks for each proxy and use the pseudo jobs manage the order flow.

In one embodiment of the invention, each systems management object includes a compensation engine. The compensation engine is configured to track the completion of task, determine when a job is complete, determine when to undo a task, undo completed tasks and/or retry tasks that have failed.

More specifically, a systems management object prepares to execute a job, a temporary last-in first-out (LIFO) queue is instantiated. Each time a task is completed, an identifier corresponds to the task is placed in the LIFO queue. When all the tasks are completed for a given job, the job is complete. In such cases, the LIFO queue flushed and the dismantled. At this point the job cannot be rewound.

However, if a given task fails, then the compensation engine obtains the top task (i.e., the task at the head of the LIFO queue) and performs the necessary operations to undo the task. Once the task is undo, the task is removed by the LIFO queue. The process is repeated until there are no tasks remaining in the LIFO queue.

In some cases, the operations to undo a task fail (i.e., the task cannot be undo). In these cases, the compensation engine (based on a policy) attempts to retry the undo operation for a pre-determined number of times. If none of the attempts are successful, then the task is marked irrecoverable and the LIFO queue (including the tasks that have not been undone) are communicated to the satellite as part of a failure report. In addition, the managed systems upon which the tasks where perform are also marked as being in an irrecoverable or unknown state.

Returning to the example directed to the provisioning of an OS, if the tasks performed by proxy management object A are successful but the tasks performed by proxy management object B are unsuccessful, then the compensation engine in the satellite management object may initiate undo operations. More specifically, the satellite management object obtains the top task on the LIFO queue it is maintaining for the job. The satellite then sends a request to the compensation engine in proxy management object A to undo the task (which was obtained from the LIFO queue in the satellite management object). The compensation engine then attempts to undo the task as discussed above and returns the results to the compensation engine in the satellite management object. The process continues until the LIFO queue in the satellite management object is empty or an irrevocable task is encountered.

Those skilled in the art will appreciate that while embodiments of the invention have been described with respect to a data center, the invention may be implemented on any network topology.

FIG. 10 represents a computer system. Embodiments of the invention may be implemented on virtually any type of computer regardless of the platform being used. For example, as shown in FIG. 10, a computer system (1000) includes one or more processor(s) (1002), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computer). The computer (1000) may also include input means, such as a keyboard (1008), a mouse (1010), or a microphone (not shown). Further, the computer (1000) may include output means, such as a monitor (1012) (e.g., a liquid crystal display (LCD), a plasma display, or cathode ray tube (CRT) monitor). The computer system (1000) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for job delegation, comprising:
receiving a job from a user by a first management object, wherein the first management object is a satellite management object (SMO) executing on a first managed system;
identifying a target system for the job using a first data model in the first management object and a job delegation policy, wherein the first data model comprises an object representing the target system, wherein the target system is a second managed system;
determining a first nexthop for the target system, wherein the first nexthop is a second management object, wherein the second management object is a proxy management object (PMO) executing on a network device, wherein the network device is one selected from a group consisting of a router and a load balancer, and wherein the PMO is configured to generate a second data model using data directly obtained from the network device and a third data model;
placing the job on a first queue corresponding to the second management object, wherein the first queue is located in the first management object;
receiving the job by the second management object;
making a determination that the PMO cannot process the job;
based on the determination:
identifying the target system and a second nexthop for the target system in the second data model in the second management object, wherein the second nexthop is a third management object and wherein the first data model comprises data obtained from the second data model;
placing the job on a second queue corresponding to the third management object, wherein the second queue is located in the second management object;
receiving the job by the third management object on the target system, wherein the third management object is an agent management object (AMO), wherein the AMO is located in an operating system of the target system, and wherein the AMO is configured to use a driver to obtain data about the target system to generate the third data model;
identifying the driver located in the third management object to execute the job; and
executing the job using the driver;
wherein the SMO is configured to communicate with the PMO and the PMO is configured to communicate with the AMO,
wherein the first managed system and the target system are each operatively connected to the network device, and
wherein the first management object, the second management object, and the third management object execute on one or more processors.

2. The method of claim 1, further comprising:
sending a notification to the first management object that the job has been executed.

3. The method of claim 1, wherein the first management object is configured to perform at least on selected from the group of: suspend the job, stop the job, resume the job, and rollback the job.

4. A system for job delegation, comprising:
a first management object, wherein the first management object is configured to:
receive a job from a user by the first management object, wherein the first management object is a satellite management object (SMO) executing on a first managed system;
identify a target system for the job using a first data model in the first management object and a job delegation policy, wherein the first data model comprises an object representing the target system, wherein the target system is a second managed system;
determine a first nexthop for the target system, wherein the first nexthop is a second management object, wherein the second management object is a proxy management object (PMO) executing on a network device, wherein the network device is one selected from a group consisting of a router and a load balancer, and wherein the PMO is configured to generate a second data model using data directly obtained from the network device and a third data model;
place the job on a first queue corresponding to the second management object, wherein the first queue is located in the first management object; and
the second management object, wherein the second management object is configured to:
receive the job;
make a determination that the PMO cannot process the job;
based on the determination:
identify the target system and a second nexthop for the target system in the second data model in the second management object, wherein the second nexthop is a third management object and wherein the first data model comprises data obtained from the second data model;
place the job on a second queue corresponding to the third management object, wherein the second queue is located in the second management object;
the third management object, wherein the third management object is configured to:
receive the job, wherein the third management object is an agent management object (AMO), wherein the AMO is located in an operating system of the target system, and wherein the AMO is configured to use a driver to obtain data about the target system to generate the third data model;
identify the driver located in the third management object to execute the job; and
execute the job using the driver,
wherein the SMO is configured to communicate with the PMO and the PMO is configured to communicate with the AMO,
wherein the first managed system and the target system are each operatively connected to the network device, and
wherein the first management object, the second management object, and the third management object execute on one or more processors.

5. The system of claim 4, wherein the job comprises a plurality of tasks, wherein each of the tasks is an atomic operation to be performed on the target system.

6. The system of claim 5, wherein the third management object maintains a last-in first-out (LIFO) queue associated with the job, wherein the LIFO queue comprises a first completed task of the plurality of tasks and wherein the LIFO queue is used by a compensation engine in the third management object to undo the first completed task if a second one of the plurality of tasks fails.

7. The system of claim 4, wherein the second management object is configured to:
send a notification to the first management object that the job has been executed.

8. The system of claim 4, wherein the first management object is further configured to perform at least on selected from the group of: suspend the job, stop the job, resume the job, and roll back the job.

9. A non-transitory computer readable medium comprising software code for delegating a job, comprising software instructions to:
receive the job from a user by a first management object, wherein the first management object is a satellite management object (SMO) executing on a first managed system;
identify a target system for the job using a first data model in the first management object and a job delegation policy, wherein the first data model comprises an object representing the target system, wherein the target system is a second managed system;
determine a first nexthop for the target system, wherein the first nexthop is a second management object, wherein the second management object is a proxy management object (PMO) executing on a network device, wherein the network device is one selected from a group consisting of a router and a load balancer, and wherein the PMO is configured to generate a second data model using data directly obtained from the network device and a third data model;
place the job on a first queue corresponding to the second management object, wherein the first queue is located in the first management object;
receive the job by the second management object;
make a determination that the PMO cannot process the job;
based on the determination:
identify the target system and a second nexthop for the target system in the second data model in the second management object, wherein the second nexthop is a third management object and wherein the first data model comprises data obtained from the second data model;

place the job on a second queue corresponding to the third management object, wherein the second queue is located in the second management object;

receive the job by the third management object on the target system, wherein the third management object is an agent management object (AMO) wherein the AMO is located in an operating system of the target system, and wherein the AMO is configured to use a driver to obtain data about the target system to generate the third data model;

identify the driver located in the third management object to execute the job; and execute the job using the driver wherein the SMO is configured to communicate with the PMO and the PMO is configured to communicate with the AMO, wherein the first managed system and the target system are each operatively connected to the network device, and wherein the first management object, the second management object, and the third management object execute on one or more processors.

10. The non-transitory computer readable medium of claim 9, wherein the second management object is configured to:

send a notification to the first management object that the job has been executed.

11. The non-transitory computer readable medium of claim 9, wherein the first management object is further configured to perform at least on selected from the group of: suspend the job, stop the job, resume the job, and roll back the job.

* * * * *

UNITED STATES PATENT AND TRADEMARK OFFICE
CERTIFICATE OF CORRECTION

PATENT NO. : 8,904,003 B2  
APPLICATION NO. : 12/165334  
DATED : December 2, 2014  
INVENTOR(S) : Wookey Page 1 of 1

It is certified that error appears in the above-identified patent and that said Letters Patent is hereby corrected as shown below:

In the Specification

In column 11, line 41, delete "through out" and insert -- throughout --, therefor.

In column 13, line 42, delete "a the" and insert -- the --, therefor.

Signed and Sealed this  
Eleventh Day of August, 2015

Michelle K. Lee  
*Director of the United States Patent and Trademark Office*